July 31, 1956     H. J. FINDLEY     2,756,852
MAGNETIC FLUID CLUTCH
Filed June 4, 1952     2 Sheets-Sheet 1
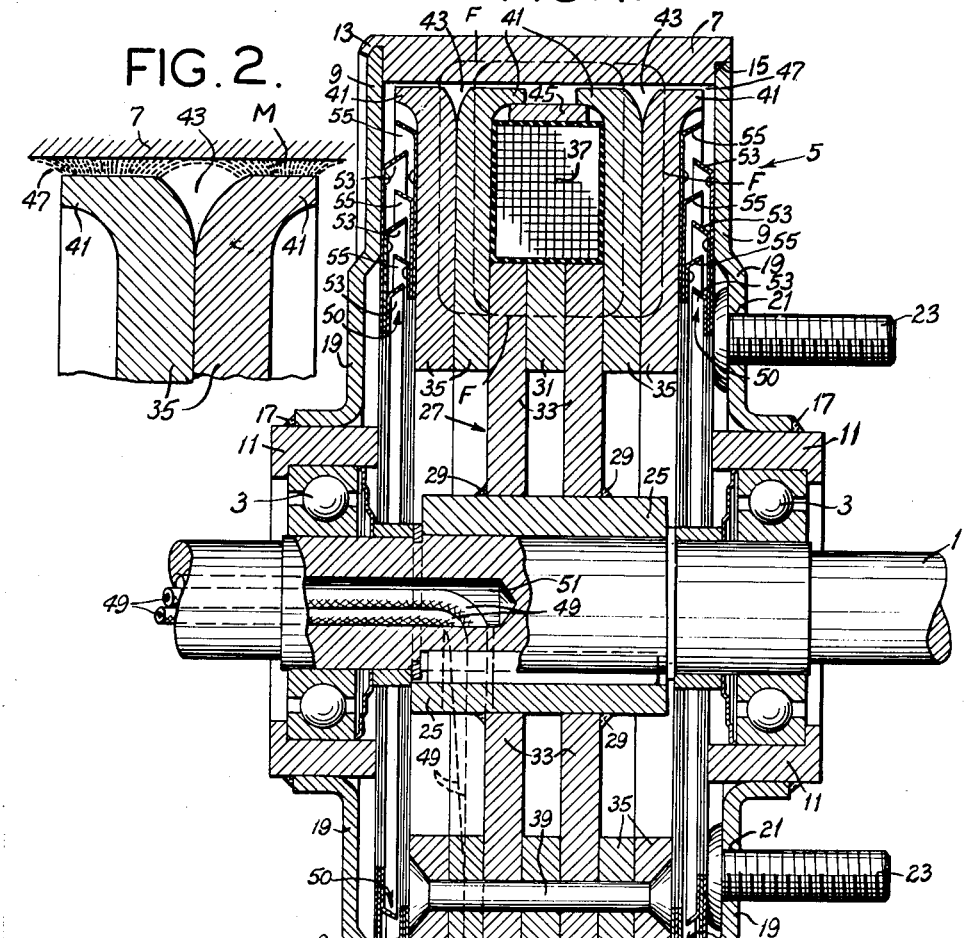
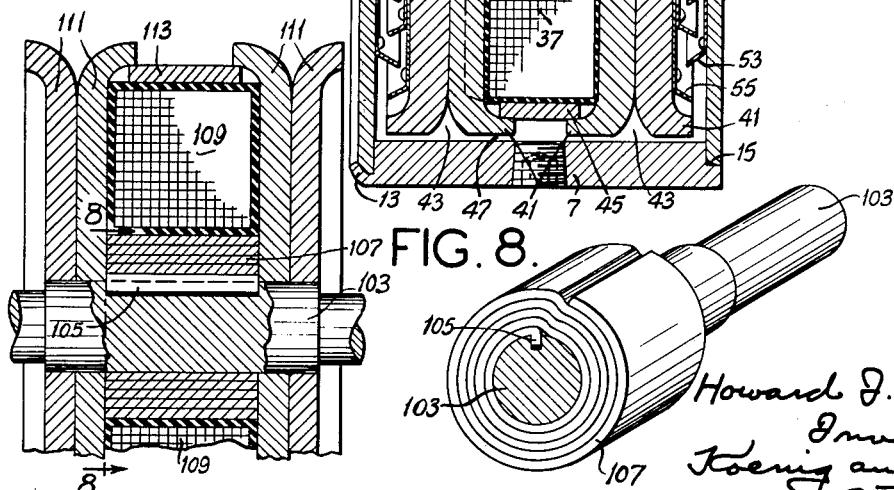
Howard J. Findley
Inventor
Koenig and Pope
Attorneys July 31, 1956  H. J. FINDLEY  2,756,852
MAGNETIC FLUID CLUTCH
Filed June 4, 1952  2 Sheets-Sheet 2

Howard J. Findley,
Inventor
Koenig and Pope
Attorneys

United States Patent Office 2,756,852
Patented July 31, 1956

2,756,852
MAGNETIC FLUID CLUTCH

Howard J. Findley, Lyndhurst, Ohio, assignor to Eaton Manufacturing Company, Cleveland, Ohio, a corporation of Ohio Application June 4, 1952, Serial No. 291,721

8 Claims. (Cl. 192—21.5)

This invention relates to electric clutches, and more particularly to field members for electric clutches or brakes and the like employing a magnetic fluid coupling mixture.

Among the several objects of the invention may be noted the provision of a simple, low-cost and efficient electric clutch employing a laminated, preferably grooved field member. Other objects will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawings, in which several of various possible embodiments of the invention are illustrated, Fig. 1 shows an axial section through a clutch showing one embodiment of the invention;

Fig. 2 is a detailed enlargement of a part of Fig. 1;

Fig. 7 is a fragmentary axial section similar to Fig. 1, showing another embodiment;

Fig. 8 is a perspective view of certain hub parts viewed as indicated by line 8—8 of Fig. 7.

Corresponding reference characters indicate corresponding parts throughout the several views of the drawings.

In my United States Patent 2,519,449 is shown a magnetic clutch having magnetic driving and driven members, one of which constitutes a polar field member. A magnetic coupling between these members is effected by employing in what would otherwise be the air gap a magnetic mixture consisting of a quantity of fine magnetic particles or iron of the order of 8 microns in diameter and a quantity of solid dry powdered lubricant such as graphite or the equivalent. The addition of this dry powdered mixture permits driving under conditions of rotary slip or rotary synchronism, depending upon excitation. Or, a wet magnetic mixture may be used consisting of a mixture of fine magnetic particles and lubricating oil, grease or the like, such as described in the United States Patent 2,575,360 of Jacob Rabinow, dated November 20, 1951, entitled Magnetic Fluid Torque and Force Transmitting Device. Similar mixtures preferably of the dry variety may be used in the present construction. Thus further specifications of the mixtures will not be necessary, being known.

Figure 5:
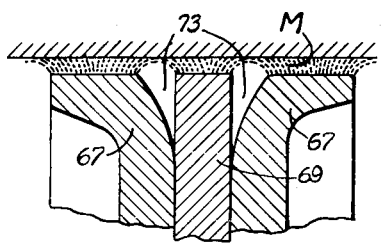
Fig. 5 is a fragmentary detailed enlargement of a part of Fig. 4.

Herein, the above-mentioned mixture, whether dry or wet, is designated M in Figs. 2 and 5 and is referred to as a magnetic fluid. For a clearer description of the rotary parts, the mixture is omitted in Figs. 1, 4, 6 and 9, although it is to be understood that such a mixture is carried in the constructions shown by these figures, as will be clear from said Figs. 2 and 5.

Referring now more particularly to Fig. 1, there is shown at numeral 1 a drive shaft mounted in bearings 3 located within a case designated generally at 5. This case is constituted by an iron inductor drum 7, end plates 9 and hubs 11 containing the bearings 3. Suitable connections are formed as by spinning, as shown at 13, or welding, as shown at 15 and 17. The plates 9 may be constituted by stampings having bulges 19 containing suitable openings 21 for the reception of studs 23. By means of the latter the case may be fastened to a part to be driven; or a stationary part if the clutch is to act as a brake. It will be understood that clutches and brakes are essentially equivalent structures, the latter being the same as the former with the driven member held stationary.

The shaft 1 carries within the case 5 a hub 25 to which is welded by means indicated at 29 a pole assembly 27. The pole assembly 27 is constituted by laminated washers 31, 33 and 35. The washers 33 inwardly extend clear of washers 31 and 35 and are welded to the hub 25 to form a main support for the pole assembly 27. Washers 33 are spaced by washer 31. Washers 31 and 33 form a peripheral support for an annular field coil 37. The coil 37 is flanged by pairs of the washers 35, the entire group of washers 31, 33 and 35 being riveted at spaced intervals, as indicated by rivets 39. All washers are preferably constituted by stampings for economy of manufacture. During the stamping operation the outer washers 35 may be flanged and trimmed, as shown at 41. All washers 35 may be substantially the same and members of a pair reversed, as indicated, to provide grooves 43 between them. Assembly is rapid, because washers 31 and 33 may be applied to hub 25, the coil 37 then placed and washers 35 applied, after which riveting is effected. At the time that the coil is inserted a nonmagnetic ring 45 is inserted around the coil and under the flanges of the inner ones of the washers 35. The washers 35 are finished to a diameter with respect to the inside diameter of the drum 7 so as to provide a small gap 47 in which the magnetic mixture M is carried, as indicated in Fig. 2.

The coil 37 may be excited by lead-in wires 49, which pass through a hollow portion 51 of the shaft to suitable slip rings. Suitable openings are provided in the hub 25 and appropriate ones of the washers 35 to accommodate these wires. Upon excitation of the coil, a toroidal flux field is generated such as indicated ideally at F. During excitation, this field F draws the magnetic mixture M into the form shown in Fig. 2, while stiffening it in a proportion to the excitation to form a slip coupling at fractional excitations and a synchronous coupling at full excitation. Upon deexcitation, the mixture ceases to form any effective coupling. Labyrinth seals 50 are provided on opposite sides of the field member, constituted by assemblies of hollow cones 53 attached to the plates 9, and assemblies of inverse hollow cones 55 attached to the outermost washers 35.

The purpose of flanging the washers 35 is not only to provide the grooves 43 but to provide a relatively large annular pole face for the flux F. The area of the pole face is such as to reduce the flux density with respect to what it would be without such flanging. In Fig. 2 is diagrammatically shown how the magnetic mixture M behaves under the flux field F. It is drawn into the general form indicated and becomes stiffer as excitation is increased, thus serving to transmit torque, either with slip at partial excitations, or at synchronism under full excitation.

Figures 4, 6:
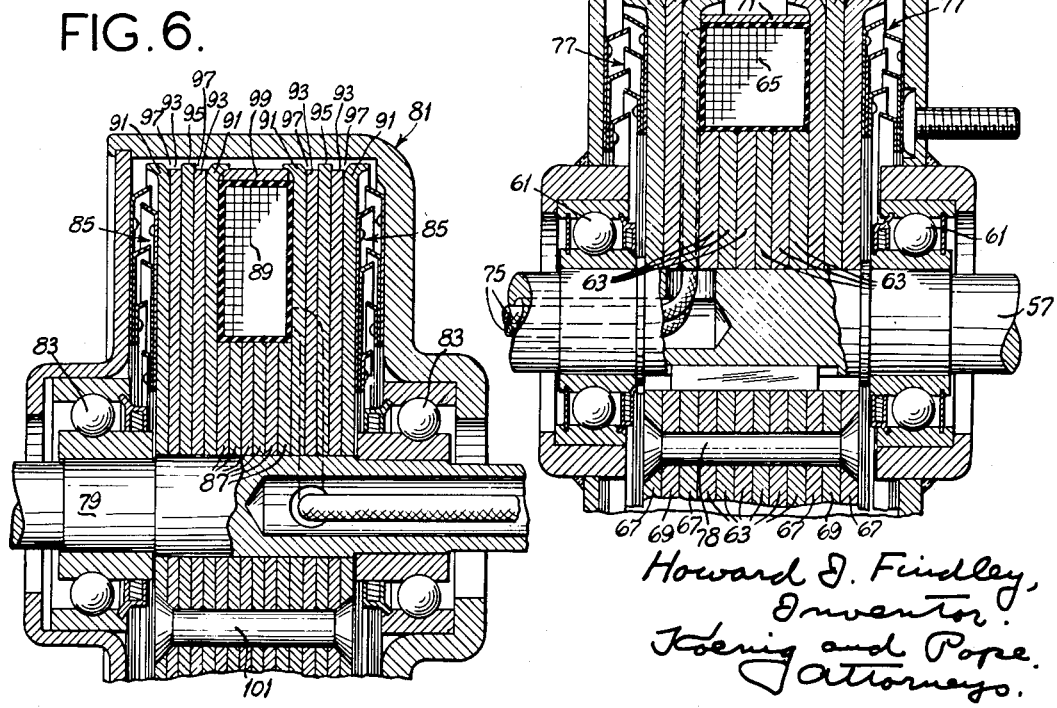
Fig. 4 is a half section, similar to Fig. 1, showing an alternative embodiment of the invention.
Fig. 6 is a half section similar to Fig. 1, showing another embodiment.

In Fig. 4 is shown an alternative embodiment of the invention, wherein the shaft is shown at 57, the case at 59 and the bearings at 61. The field member in this embodiment is composed of washers 63 within the coil 65 and a pair of flanged washers 67 on each side of the coil. Each of the latter sandwiches a washer 69. The sandwiched washer 69 is not flanged, as are the washers 67. Grooves 73 are thus provided. Again, between the inner two washers 67 is held a nonmagnetic ring 71. The primary difference between this construction and that shown in Fig. 1 is that the full laminating effect of the washers is carried on down to the shaft 57. Lead-in wires for excitation are shown at 75, suitable openings being provided to accommodate them. Labyrinth seals are provided as shown at 77, and one of the fastening rivets is shown at 78.

In Fig. 6 is shown a variation wherein numeral 79 indicates the shaft, 81 the housing, 83 the bearings and 85 the labyrinth seals. In this case washers 87 support coil 89. The parts flanking the coil are constituted by pairs of flanged washers 91, between which are sandwiched unflanged washers 93 of relatively small diameter, and unflanged washers 95 of larger diameters. The diameters of the washers 91 and 95 are substantially equal. This provides grooves 97. The nonmagnetic ring around coil 89 is shown at 99, being held by the flanges of the innermost washers 91. One of the fastening rivets is shown at 101.

Figure 3:
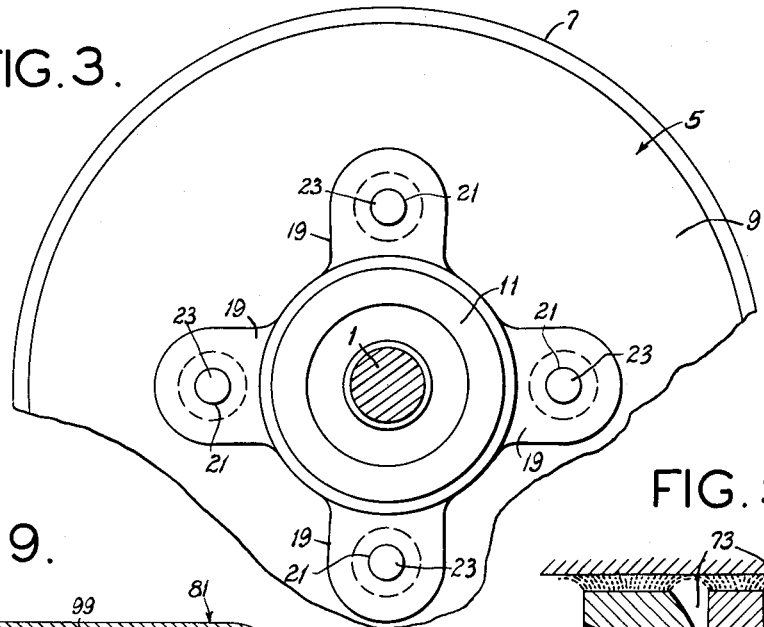
Fig. 3 is a right-side elevation, on a reduced scale, of Fig. 1.
Figure 9:
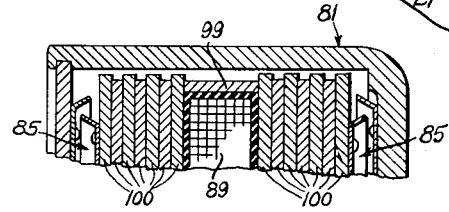
Fig. 9 is a fragmentary section similar to that of Fig. 6 but showing another form of the invention.

In Fig. 9 is shown a construction similar to that of Fig. 6. In this modification, the washers 87 again support the coil 89 and the latter is surrounded by a nonmagnetic ring. The coil is flanked on each side by seven washers 100, none of the edges of which are flared. Otherwise the construction of Fig. 9 is the same as that of Fig. 6, as the remaining reference characters indicate.

In Figs. 7 and 8 is shown a form of the invention similar to that shown in Fig. 1, with certain differences. In this case the shaft is shown at numeral 103. Keyed to the shaft at 105 is the inner end of a spiral iron sheet 107 forming magnetic rings around the shaft. Around this ring-forming spiral is located the coil 109. Pairs of flanged laminating washers 111, located back to back, flanked the coils, being fastened to the shaft 103. The nonmagnetic ring around coil 109 and held by the flanges of the innermost washers 111 is shown at 113. The surrounding casing parts are not shown in Fig. 7. While this construction is similar to that shown in Fig. 1, it differs in that the magnetic flux, in looping within coil 109, is not required to pass through so large a number of interfaces between washers.

One of the advantages of the invention is that by making up the field member of laminated washers or rings, the several groups of which are composed of like shapes, the parts may be manufactured at low cost. The structure is simple to assemble and requires no machining after assembly to provide the grooves mentioned. Moreover, an efficient machine results. The invention is particularly useful for constructing smaller sizes of clutches, although it is not to be considered as limited to them. For example, the Fig. 1 form of the invention represents a machine having a field member which is 7¾ inches in diameter; the Fig. 4 form of the invention represents a machine which has a field member 5 inches in diameter; and the Fig. 6 construction represents a machine having a field member 3½ inches in diameter. It will be understood that the washers, although they have a laminating effect, are not as thin as the usual thin sheet metal laminations used in electrical machinery, although they might be under certain circumstances. It will be further understood that "laminating" as used herein does not mean magnetic or electrical separation as used in conventional electrical machinery especially of the A. C. type. It is most important in the presently devised field members that the interfaces be clean, flat and smooth so as to make the best possible magnetic joint with a minimum "air gap" separation. For example, the washers in the Fig. 1 form of the invention have a thickness of $9/32$ inch; those in the Fig. 4 form of the invention have a thickness of approximately ⅛ inch; and those of the Fig. 6 form of the invention approximately $1/16$ inch.

Since, as above indicated, brakes are special forms of clutches wherein the driven member is locked, the term clutch as used in the appended claims is intended to include brake structures.

In view of the above, it will be seen that the several objects of the invention are achieved and other advantageous results attained.

As various changes could be made in the above constructions without departing from the scope of the invention, it is intended that all matter contained in the above descripion or shown in the accompanying drawings shall be interpreted as illustrative and not in a limiting sense.

I claim:

1. A magnetic fluid clutch comprising a central rotary member, a rotary magnetic cylinder spaced from and surrounding said central rotary member, an annular magnetic field coil spaced from and surrounding said central rotary member and spaced from the inside of the cylinder, an annular laminated magnetic centering means located within the inside diameter of the field coil and supporting it upon said central rotary member, and a plurality of axially stacked magnetic discs flanking each side of the coil and being attached in magnetic contact with each other and with said centering means to form a field member, the outer margins of said discs forming a magnetic gap with respect to said cylinder, said discs being individually marginally shaped to provide peripheral circular grooves in the field member, said grooves thus formed being distributed on opposite sides of said coil, said laminated centering means being constituted by a spiral strip, the width of said strip being substantially equal to the width of said coil.

2. A magnetic fluid clutch comprising a central rotary member, a rotary magnetic cylinder spaced from and surrounding said central rotary member, an annular magnetic field coil spaced from and surrounding said central rotary member and spaced from the inside of the cylinder, an annular laminated magnetic centering means located within the inside diameter of the field coil and supporting it upon said central rotary member, and a plurality of axially stacked magnetic discs flanking each side of the coil and being attached in magnetic contact with each other and with said centering means to form a field member, the outer margins of said discs forming a magnetic gap with respect to said cylinder, said discs being individually marginally shaped to provide peripheral circular grooves in the field member, said grooves thus formed being distributed on opposite sides of said coil, the margins of said discs being formed as axially directed flanges.

3. A magnetic fluid clutch made according to claim 2, wherein at least two of the flanges on at least one side of the coil are oppositely directed so as to form a peripheral groove between them.

4. A magnetic fluid clutch comprising a central rotary member, a rotary magnetic cylinder spaced from and surrounding said central rotary member, an annular magnetic field coil spaced from and surrounding said central rotary member and spaced from the inside of the cylinder, an annular laminated magnetic centering means located within the inside diameter of the field coil and supporting it upon said central rotary member, and at least three axially stacked magnetic discs flanking each side of the coil and being attached in magnetic contact with each other and with said centering means to form a field member, the outer margins of said discs forming a magnetic gap with respect to said cylinder, said discs being individually marginally shaped to provide peripheral circular grooves in the field member, said grooves thus formed being distributed on opposite sides of said coil, the margins of at least two of the discs on a side being spaced by another unflanged disc on the respective side and being oppositely flanged in an axial direction so as to form at least one peripheral groove.

5. A magnetic fluid clutch comprising a central rotary member, a rotary magnetic cylinder spaced from and surrounding said central rotary member, and annular magnetic field coil spaced from and surrounding said central rotary member and spaced from the inside of the cylinder, an annular laminated magnetic centering means located within the inside diameter of the field coil and supporting it upon said central rotary member, and at least three axially stacked magnetic discs flanking each side of the coil and being attached in magnetic contact with each other and with said centering means to form a field member, the outer margins of said discs forming a magnetic gap with respect to said cylinder, said discs being individually marginally shaped to provide peripheral circular grooves in the field member, said grooves thus formed being distributed on opposite sides of said coil, the diameter of at least one disc on a side being less than the diameter of other discs on the respective side and lying between them to form one of said peripheral circular grooves, at least two of the discs which have the larger diameters having peripheral flanges directed away from one another.

6. A magnetic fluid clutch comprising a central rotary member, a rotary magnetic cylinder spaced from and surrounding said central rotary member, an annular magnetic field coil spaced from and surrounding said central rotary member and spaced from the inside of the cylinder, an annular laminated magnetic centering means located within the inside diameter of the field coil and supporting it upon said central rotary member, a plurality of axially stacked magnetic discs flanking each side of the coil and being attached in magnetic contact with each other and with said centering means to form a field member, the outer margins of said discs forming a magnetic gap with respect to said cylinder, said discs being individually marginally shaped to provide peripheral circular grooves in the field member, said grooves thus formed being distributed on opposite sides of said coil, and a nonmagnetic ring surrounding the coil, at least the discs adjacent the coil being flanged toward one another so as respectively to envelope the margins of said nonmagnetic ring.

7. A magnetic fluid clutch made according to claim 4, wherein at least one unflanged disc is located between two of said flanged discs and having a diameter less than the diameters of said flanged discs.

8. A magnetic fluid clutch comprising a central rotary member, a rotary magnetic cylinder spaced from and surrounding said central rotary member, an annular magnetic field coil spaced from and surrounding said central rotary member and spaced from the inside of the cylinder, a nonmagnetic ring surrounding the coil, annular magnetic centering means located within the inside diameter of the field coil and supporting it upon said central rotary member, the axial widths of said nonmagnetic ring and of said centering means being approximately equal, and a plurality of at least three axially stacked magnetic discs flanking each side of the coil and being attached in magnetic contact with each other and with said centering means to form a field member, the outer margins of said discs forming a magnetic gap with respect to said cylinder, the diameter of at least one disc on a side being less than the diameter of two discs adjacent thereto, whereby at least one circular peripheral groove is formed on each side of said coil.

References Cited in the file of this patent
UNITED STATES PATENTS

| | | |
|---|---|---|
| 1,084,148 | Huguenin | Jan. 13, 1914 |
| 1,457,475 | Van Norden | June 5, 1923 |
| 2,317,290 | McIlvried | Apr. 20, 1943 |
| 2,631,705 | Winther | Mar. 17, 1953 |
| 2,663,809 | Winslow | Dec. 22, 1953 |